US012801692B2

(12) United States Patent
Ekambaram et al.

(10) Patent No.: US 12,801,692 B2
(45) Date of Patent: Nov. 17, 2026

(54) LIGHTWEIGHT SENSOR PROXY DISCOVERY IN POWER-AWARE DEVICES

(71) Applicant: International Business Machines Corporation, Armonk, NY (US)

(72) Inventors: Vijay Ekambaram, Chennai (IN); Arindam Jati, Bengaluru (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 18/334,571

(22) Filed: Jun. 14, 2023

(65) Prior Publication Data

US 2024/0419762 A1 Dec. 19, 2024

(51) Int. Cl.
*G06F 17/40* (2006.01)
*G06F 17/15* (2006.01)

(52) U.S. Cl.
CPC .............. *G06F 17/40* (2013.01); *G06F 17/15* (2013.01)

(58) Field of Classification Search
CPC .................................. G06F 17/40; G06F 17/15
See application file for complete search history.

(56) References Cited

U.S. PATENT DOCUMENTS 10,412,210 B2 9/2019 Bjontegard
10,806,398 B2 10/2020 Miller et al.
11,113,337 B2 * 9/2021 Bandyopadhyay .... G06N 5/022
11,775,873 B2 * 10/2023 Wang .................... G06F 18/214 706/62
2014/0075043 A1 3/2014 Gerecke
2017/0010666 A1 1/2017 Tanaka et al.
2021/0144517 A1 5/2021 Guim Bernat et al.
2022/0173924 A1 6/2022 Shribman et al.
2022/0327332 A1 * 10/2022 Straehle .................. G06F 18/24

OTHER PUBLICATIONS

Wu et al., "Data Imputation for Multivariate Time Series Sensor Data With Large Gaps of Missing Data", 2022, IEEE Publication, vol. 22, No. 11, pp. 10671-10683, (Year: 2022).*
Jin et al., "A Prediction Algorithm for Coexistence Problem in Multiple-WBAN Environment", 2015, International Journal of Distributed Sensor Networks, pp. 1-8 (Year: 2015).*

(Continued)

*Primary Examiner* — Elias Desta

(74) *Attorney, Agent, or Firm* — SCULLY, SCOTT, MURPHY & PRESSER, P.C.; Monchai Chuaychoo

(57) ABSTRACT

Systems and methods for lightweight proxy virtualization of a plurality of sensor data streams in a device are described. A processor can receive a plurality of sensor data streams from a plurality of sensors. The processor can identify missing sensor data in a sensor data stream among the plurality of sensor data streams. The processor can predict a value of the missing sensor data by running a machine learning model trained using sensor data determined based on at least one of a plurality of co-existence probabilities of the plurality of sensor data streams and a plurality of co-prediction accuracies of the plurality of sensor data streams.

19 Claims, 5 Drawing Sheets

(56) References Cited

OTHER PUBLICATIONS

Lin et al,"Filling Missing Values on Wearable-Sensory Time Series Data", Published In: Proceedings of the 2020 SIAM International Conference on Data Mining,Jan. 2020, 10 pages. https://www.researchgate.net/publication/340218114_Filling_Missing_Values_on_Wearable-Sensory_Time_Series_Data.
Huo et al, "Dynimp: Dynamic Imputation for Wearable Sensing Data through Sensory and Temporal Relatedness", Published In: ICASSP 2022—2022 IEEE International Conference on Acoustics, Speech and Signal Processing (ICASSP), Apr. 27, 2022. 5 pages. https://ieeexplore.ieee.org/document/9747062.
Węgrzyn-Wolska et al.,"Missing-data imputation using wearable sensors in heart rate variability" Published In: Bulletin of the Polish Academy of Sscience Technical Sciences, vol. 68,2020.7 pages. https://journals.pan.pl/Content/116296/PDF/10D_255-261_01354_Bpast.No.68-2_19.04.20_KA_SS.pdf.
Saha, et al,"Imputing Missing Social Media Data Stream in Multisensor Studies of Human Behavior",Published In: Proceedings of the 8th International Conference on Affective Computing and Intelligent Interaction (ACII 2019), Jul. 2019. 8 pages. https://www.researchgate.net/publication/334669683_Imputing_Missing_Social_Media_Data_Stream_in_Multisensor_Studies_of_Human_Behavior.

* cited by examiner $P_E(s_i,s_j)$ 222

| | S1 | S2 | S3 | s4 |
|---|---|---|---|---|
| S1 | -- | 0.6 | 0.7 | 1.0 |
| S2 | 0.6 | -- | 1.0 | 0.6 |
| S3 | 0.7 | 1.0 | -- | 0.9 |
| S4 | 1.0 | 0.6 | 0.9 | -- |

$p(s_i,s_j)$ 224

| | S1 | S2 | S3 | s4 |
|---|---|---|---|---|
| S1 | -- | 0.7 | 0.5 | -0.9 |
| S2 | 0.7 | -- | -0.9 | 0.6 |
| S3 | -0.6 | 0.8 | -- | 0.8 |
| S4 | 0.8 | -0.6 | 0.7 | -- |

LIGHTWEIGHT SENSOR PROXY DISCOVERY IN POWER-AWARE DEVICES

BACKGROUND

The present application relates to machine learning systems, and in particular to lightweight sensor proxy discovery in power-aware devices.

Wearable devices can include multiple sensors capable of collecting data by acquiring biological or physical data of users. In an aspect, wearable devices can use the collected data to perform run-time artificial intelligence (AI) edge model training and inferences for various applications. In an aspect, wearable devices can be power-aware devices, such as devices that are designed and operated with a goal of minimizing power dissipation. Due to the power-aware nature of wearable devices, there could be scenarios where data from some sensors could be missing at various point in time.

SUMMARY

In one embodiment, a computer-implemented method for sensor proxy virtualization is generally described. The method can include receiving a plurality of sensor data streams from a plurality of sensors. The method can further include identifying missing sensor data in a sensor data stream among the plurality of sensor data streams. The method can further include predicting a value of the missing sensor data by running a machine learning model trained using sensor data determined based on at least one of a plurality of co-existence probabilities of the plurality of sensor data streams and a plurality of co-prediction accuracies of the plurality of sensor data streams.

In one embodiment, a system for sensor proxy virtualization is generally described. The system can include a plurality of sensors, a memory and a processor. The memory can be configured to store a plurality of co-existence probabilities of the plurality of sensors and a plurality of co-prediction accuracies of the plurality of sensors. The processor can be configured to receive a plurality of sensor data streams from a plurality of sensors. The processor can be further configured to identify missing sensor data in a sensor data stream among the plurality of sensor data streams. The processor can be further configured to predict a value of the missing sensor data by running a machine learning model trained using sensor data determined based on at least one of the plurality of co-existence probabilities of the plurality of sensor data streams and the plurality of co-prediction accuracies of the plurality of sensor data streams.

In one embodiment, a computer program product for sensor proxy virtualization is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
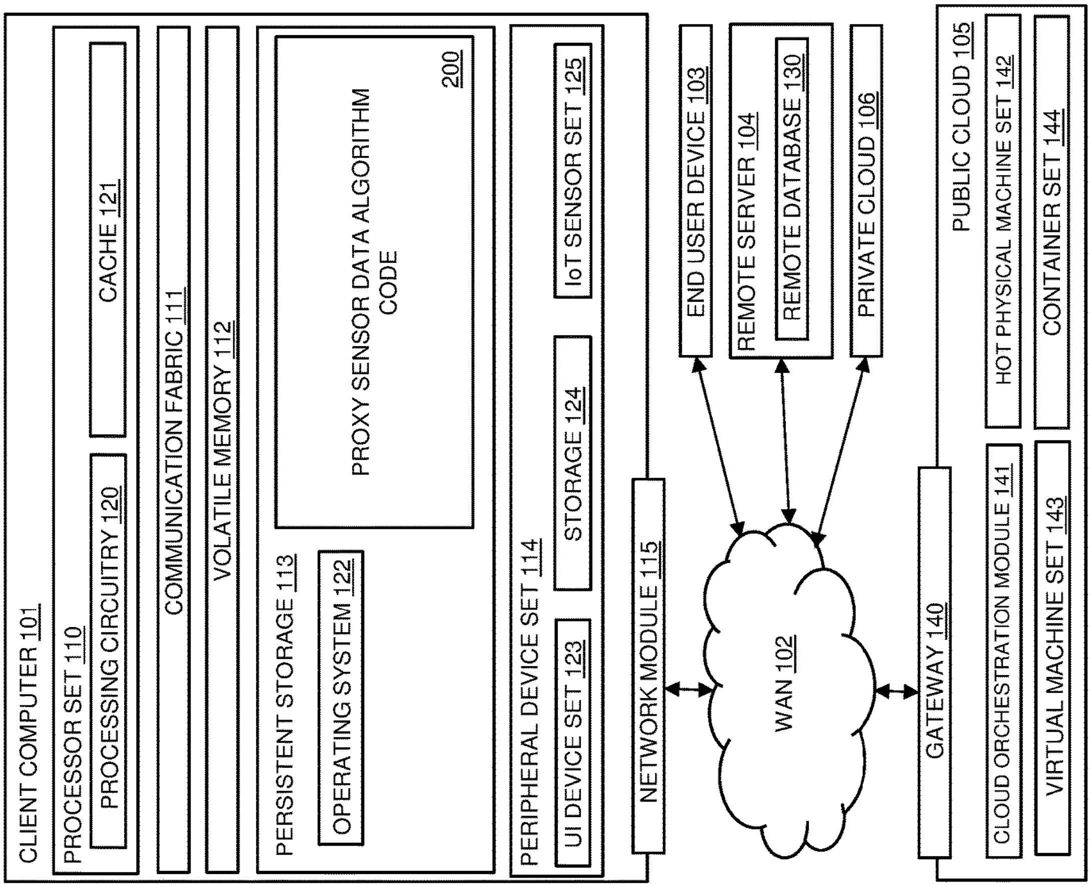
FIG. 1 illustrates an example computer or processing system or environment that may implement a system for lightweight sensor proxy discovery in power-aware devices according to one embodiment.

FIG. 1 illustrates an example computer or processing system or environment that may implement a system for lightweight sensor proxy discovery in power-aware devices according to one embodiment. As shown in FIG. 1, computing environment 100 can include an example of an environment for the execution of at least some of the computer code involved in performing the inventive methods, such as a proxy sensor data algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Systems and devices that use multiple sensors to collect data, such as wearable devices that use multiple to collect biological or physical data of users, can encounter situations where some of the sensor data may be missing or unavailable. At the outset, it is noted that any data collection from a user that may be done, may be performed based on receiving a permission from that user. For example, a user can be given a choice to opt-in or opt-out. If there are data missing from some of the sensors, modeling may not be performed by the device due to improper input format and/or unavailable sensor data. In an aspect, using a set of selective sensors that has available sensor data can increase the chance of having input data for training models, but there is a risk of omitting important data from sensors with unavailable sensor data. In another aspect, adaptive machine learning models can be trained, but such models tend to become biased towards data collected from sensors that have available sensor data more frequently than other sensors. Other standard imputation techniques such as forward fill and backward fill using may require a relatively long sequence of data, thus increasing computation time and power dissipation.

To be described in more detail below, systems (e.g., system 100 and other systems described below) and methods described herein can address missing sensor data by discovering and creating a light-weight proxy-virtualization environment for all sensors in the system based on co-existence probabilities and co-prediction accuracies among multiple sensors. The proxy-virtualization environment can include, for example, a virtualization layer that can be implemented as a process to predict and/or generate proxy sensor data that can replace missing sensor data. A co-existence probability between two sensors can be the probability when the two sensors are both turned on, or when sensor data is available from both sensors. A co-prediction accuracy can be referring to a prediction accuracy when sensor data of one sensor is being used for predicting proxy sensor data for another sensor. The light-weight proxy-virtualization environment can use the co-existence probabilities and the co-prediction accuracies to train a lightweight machine learning model for each one of the sensors in the system. The proxy sensor models can be trained using lightweight machine learning modeling techniques such as incremental learning. Each one of the lightweight proxy sensor models can map or associate a sensor with one or more sensors based on its co-existence probability and co-prediction accuracy with other sensors. A processor can run these lightweight proxy sensor models to use sensor data from the mapped sensors to generate proxy sensor data for a sensor with unavailable sensor data. Thus, these lightweight proxy sensor models can provide replacement data streams when the actual sensor data stream is unavailable (e.g., sensor data unavailable).

By using the light-weight proxy sensor models, uninterrupted multi-sensor edge AI modelling can occur even when actual sensor data is missing or unavailable. Further, lightweight proxy sensor model for every sensor can be auto-discovered with minimal complexity since these lightweight proxy sensor models are trained based on co-existence probabilities and co-prediction accuracies with other correlated sensors. The lightweight machine learning model training described herein can consume relatively less computational resource when compared to conventional techniques, such as techniques where models are trained using past time series sensor data. Also, the lightweight proxy sensor models trained using co-existence probabilities and co-prediction accuracies can mitigate the effect of producing proxy sensor models that may bias towards a particular recently seen sensor data stream, or bias toward sensor data stream having available sensor data frequently.

Figure 2:
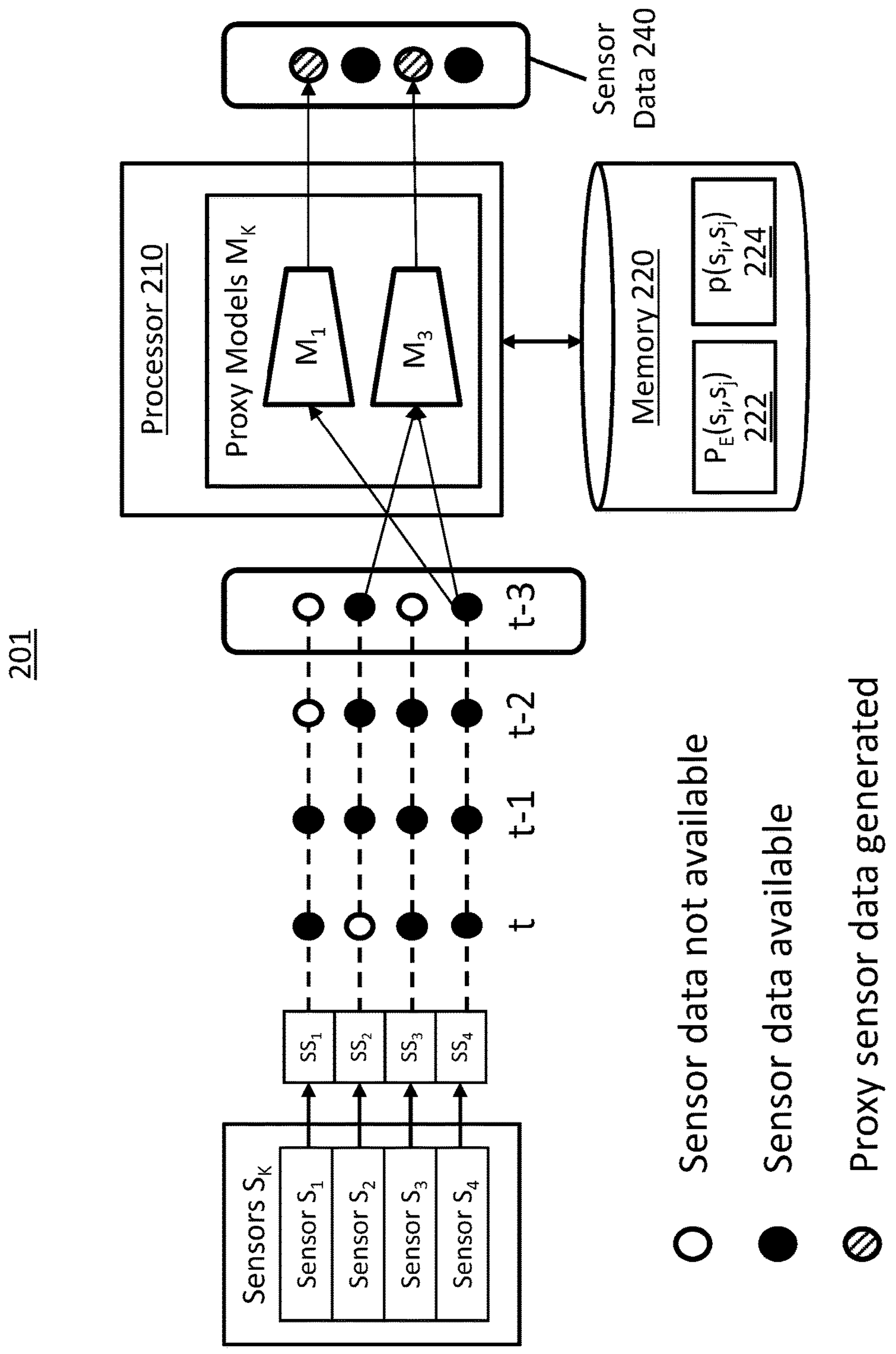
FIG. 2 illustrates an example implementation of lightweight sensor proxy discovery in power-aware devices in one embodiment.

FIG. 2 illustrates an example implementation of light-weight sensor proxy discovery in power-aware devices in one embodiment. A system 201 is shown in FIG. 2. System 201 can be a computing system including at least a processor 210, a memory 220, and a plurality of sensors $S_K$, such as sensors $S_1$, $S_2$, $S_3$, $S_4$(e.g., total of K sensors). System 201 can be an edge computing device. Processor 210 can be composed of at least one of microprocessors, microcontrollers, central processing units (CPU), single core processors, multi-core processors, other types of processors, and/or computing hardware composed of analog and/or digital circuitry. Memory 220 can be composed of at least one of volatile memory (e.g., random access memory (RAM) including static RAM and dynamic RAM, and/or other volatile memory (e.g., read only memory (ROM), erasable programmable ROM, and electrically erasable programmable ROM, and/or other non-volatile memory). Memory 220 can be configured to store data in digital form, and can be configured to store instructions as various forms of program code. Processor 210 can be configured to access and run program codes stored in memory 220 to perform various computer operations.

In one embodiment, memory 220 can be configured to store program code such as source code and/or executable code that can be accessed by processor 210 to perform different tasks and operations. By way of example, processor 210 can access data and program code stored in memory 220 to perform operations relating to sensors $S_K$, and to perform operations such as machine learning model training and inference, and other application specific arithmetic and computations relating to the systems and methods described herein.

Sensors $S_K$ can be the same type of sensors or can be different types of sensors within system 201. In one embodiment, system 201 can be implemented in a wearable device such as a smartwatch, a fitness monitoring device, or the like. In one embodiment, sensors $S_K$ can include one or more of oximetry sensors, ambient light sensors, accelerometers, gyroscope, barometric pressure sensors, microphones, ambient temperature sensors, magnetometers, skin conductance sensors, skin temperature sensors, global positioning system (GPS), sensors for heart rate monitoring, or other types of sensors. Even though four sensors are shown in FIG. 2, system 201 can include an arbitrary number of sensors.

Each one of sensors $S_K$ can output a respective sensor data stream to processor 210. In the example shown in FIG. 2, sensors $S_1$, $S_2$, $S_3$, $S_4$ can output sensor data streams labeled as $SS_1$, $SS_2$, $SS_3$, $SS_4$, respectively. If system 201 has K sensors, then there are K sensor data streams being received at processor 210. A sensor data stream $SS_K$ can be time-stamped data or time series data transmitted as a sequence of data points indexed in time order. Each sensor data stream $SS_K$ can include successive measurements made from the same sensor over a fixed time interval t. As shown in FIG. 2, the sensor data streams $SS_K$ can include sensor data measured from sensors $S_K$ at different times, such as times t−3, t−2, t−1, t. In the example shown in FIG. 2, there are some time instances where sensor data may be missing from sensor data streams $SS_K$. By way of example, sensor data streams $SS_1$, $SS_3$ are missing sensor data at time t−3, sensor data stream $SS_1$ is missing sensor data at time t−2, no sensor data stream is missing sensor data at time t−1, and sensor data stream $SS_2$ is missing sensor data at time t. In an aspect, sensor data can be missing or unavailable in a sensor data stream due to various reasons, such as a sensor being turned off or in a low power or sleep mode, a sensor not being in an appropriate physical position or location to capture data. For example, in cases of wearable devices user movement can impact physical positions and location of sensors in the wearable device.

Missing data in the sensor data streams can negatively impact operations of the device implementing system 201. By way of example, if system 201 is being implemented in a wearable device such as a smartwatch, applications of the smartwatch may need the sensor data to monitor various health related parameters of the user using the wearable device. By way of example, a heart rate monitoring application installed in the wearable device may need to monitor a heart rate of the user using sensor data from one or more of sensors $S_K$. The unavailable or missing sensor data in the sensor data streams can reduce an accuracy of the heart rate monitoring application because insufficient data may be provided to the heart rate monitoring application. In another example, a GPS of the smartwatch may need to use sensor data from a gyroscope among the sensors of system 201 to determine a geographical location of the wearable device. The unavailable or missing sensor data in the sensor data streams can reduce an accuracy of the location being determined by the GPS.

A plurality of co-existence probabilities 222, denoted as $P_E(s_i, s_j)$, and a plurality of co-prediction accuracies 224, denoted as $p(s_i, s_j)$ can be stored in memory 220. To address issues raised by missing or unavailable sensor data in the sensor data streams, processor 210 can use $P_E(s_i, s_j)$ and $p(s_i, s_j)$ to determine which sensor data streams can be used for training and updating proxy sensor models. The trained proxy sensor models can predict proxy sensor data for the unavailable sensor data. The representation $s_i$ can correspond to an i-th sensor among $S_K$ or an i-th sensor data stream among $SS_K$. The representation $s_j$ can correspond to an j-th sensor among $S_K$ or an j-th sensor data stream among $SS_K$. Each one of co-existence probabilities 222 can correspond to a pair of sensors or sensor data stream $s_i$ and $s_j$, and can be a probability when the pair of sensors are both turned on, or when sensor data in both $s_i$ and $s_j$ are available. Each one of co-prediction accuracies 224, such as $p(s_i, s_j)$, can correspond to a pair of sensors or sensor data streams $s_i$ and $s_j$, and can be a prediction accuracy of using sensor data from a j-th sensor data stream to predicting proxy sensor data for an i-th sensor data stream.

Processor 210 can be configured to determine co-existence probabilities 222 and co-prediction accuracies 224 and store co-existence probabilities 222 and co-prediction accuracies 224 in memory 220. In one embodiment, co-existence probabilities 222 and co-prediction accuracies 224 can be stored as matrices in memory 220. In another embodiment, co-existence probabilities 222 and co-prediction accuracies 224 can be stored as lookup tables in memory 220. Processor 210 can be configured to train, for each sensor in system 201, a proxy sensor model that can predict proxy sensor data. If there are K sensors in system 201, then processor 210 can train K proxy sensor models $M_K$. A proxy sensor model $M_K$ can be represented as $M_{Si(t)}=f(s_j(t)|j=1 \ldots n)$, where $S_i(t)$ represents the sensor data stream with unavailable data at time t, $j \neq i$, and n is an index of sensor data streams selected for training proxy sensor model $M_K$. The function f(•) can be a machine learning (ML) model that can be trained incrementally, such as a Hoeffding decision tree, light gradient-boosting machine (lightGBM), or the like, that can take sensor data from $s_j(t)$ (for $j=1 \ldots n$) as input and output a prediction of proxy sensor data for $S_i(t)$. A proxy sensor model $M_K$ can be trained and updated using sensor data from a selective set of sensor data streams mapped to, or associated with, sensor data stream $SS_K$. One or more sensor data streams can be mapped to, or associated with, a sensor data stream $SS_K$ such that sensor data from the one or more sensor data streams can be used for predicting proxy sensor data for the sensor data stream $SS_K$. Sensor data from these associated sensor data streams can be inputted into the ML model f(•) to generate a prediction (e.g., predicted value) for missing sensor data in sensor data stream $SS_K$. The selection of sensor data streams for the associations in the proxy sensor models $M_K$ can be based on values of co-existence probabilities 222 and co-prediction accuracies 224 stored in memory 220. Processor 210 can apply the selected sensor data streams to train and update proxy sensor models $M_K$. Further, processor 210 can run the trained and updated proxy sensor models $M_K$ to predict values of missing sensor data in sensor data streams $SS_K$.

By way of example, as shown in FIG. 2, processor 210 can run a proxy sensor model $M_1$ for sensor $S_i$ at time t−3, where proxy sensor model $M_1$ can input sensor data from sensor data stream $SS_4$ into ML model f(•) to predict and generate proxy sensor data that can replace the unavailable sensor data in sensor data stream $SS_1$ at time t−3. Also at time t−3, processor 210 can run another proxy $M_3$ for sensor $S_3$ at time t−3, where proxy sensor model $M_3$ can input sensor data from sensor data streams $SS_2$, $SS_4$ into ML model f(•) to predict and generate proxy sensor data that can replace the unavailable sensor data in sensor data stream $SS_3$ at time t−3. Processor 210 can use the proxy sensor models $M_K$ to predict and generate proxy data for all missing data at time t−3. Although four different times spanning from t−3 to t are shown in FIG. 2, system 201 can be implemented to track and monitor sensor data streams for an arbitrary amount of time and the time interval t can be programmable by processor 210.

As a result of processor 210 generating proxy sensor data, a set of sensor data 240 including original sensor data (e.g., directly provided by sensors $S_K$) and proxy sensor data can be used by other applications. Processor 210 can provide sensor data 240 to various applications and the applications can function without any missing sensor data. Further, processor 210 can be configured to periodically update co-existence probabilities 222 and co-prediction accuracies 224, and also periodically retrain and update proxy sensor models $M_K$ to improve an accuracy of the proxy sensor models $M_K$ over time.

Figure 3:
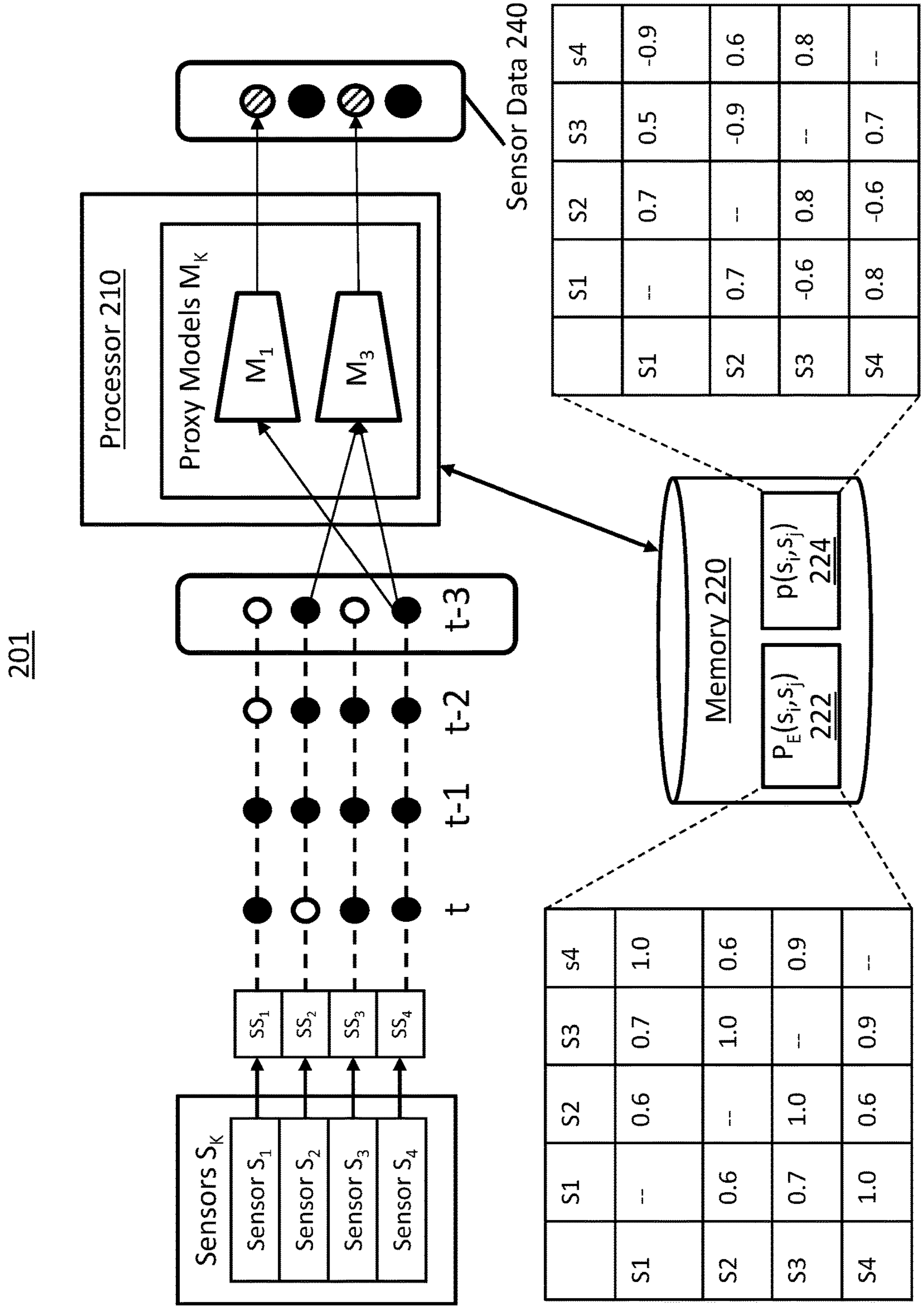
FIG. 3 illustrates details of co-existence probabilities and co-prediction accuracies that can be used for implementing lightweight sensor proxy discovery in power-aware devices in one embodiment.

FIG. 3 illustrates details of co-existence probabilities and co-prediction accuracies that can be used for implementing lightweight sensor proxy discovery in power-aware devices in one embodiment. Examples of co-existence probabilities 222 and co-prediction accuracies 224 stored in memory 220 are shown in FIG. 3. The values of co-existence probabilities 222 can be represented as positive decimals numbers ranging from 0.0 to 1.0. In one embodiment, co-existence probabilities $P_E(s_i, s_j)=n_{i,j}/N$, where $n_{i,j}$ can represent a count of occurrences when the i-th and j-th sensor data streams include available sensor data and N represents the total time steps, or total number of times processor 210 collected data from sensor data streams $SS_K$ (periodically at time interval t), after the device implementing system 201 was reset.

The values of co-existence probabilities 222 ranging from 0.0 to 1.0 represent probabilities ranging from 0% to 100%. In the example shown in FIG. 3, sensor data streams $SS_1$, $SS_2$ have a probability of approximately 60% to have sensor data available at the same time. Further, sensor data streams $SS_1$, $SS_3$ have a probability of approximately 70% to have sensor data available at the same time and sensor data streams $SS_1$, $SS_4$ have a probability of approximately 100% to have sensor data available at the same time.

Processor 210 can be configured to generate and update the values of co-existence probabilities 222 by tracking co-existence events of every pair of sensors at each time instance. A co-existence event of a pair of sensors can be, for example, an event where sensor data is available from sensor data streams of both sensors in the pair of sensors. The tracking of co-existence events can allow processor 210 to determine whether each one of sensor data streams $SS_K$ is missing data or includes available data. By way of example, at time t−3, since sensor data streams $SS_2$, $SS_4$ both have sensor data, and sensor data is unavailable at sensor data streams $SS_1$, $SS_3$, processor 210 can increment $n_{2,4}$ and $n_{4,2}$ to increase the co-existence probabilities $P_E(s_2, s_4)$ and $P_E(S_4, S_2)$ and maintain the rest of the $n_{i,j}$ values. At time t−2, since sensor data streams $SS_2$, $SS_3$, $SS_4$ have sensor data, and sensor data is unavailable at sensor data stream $SS_1$, processor 210 can increment $n_{2,4}$, $n_{4,2}$ $n_{2,3}$, $n_{3,2}$, $n_{3,4}$, $n_{4,3}$ to increase the co-existence probabilities $P_E(s_2, s_4)$, $P_E(S_4, S_2)$, $P_E(s_2, s_3)$, $P_E(S_3, S_2)$, $P_E(S_3, S_4)$ and $P_E(S_4, S_3)$, and maintain the rest of the rest of the $n_{i,j}$ values. Processor 210 can be configured to continuously update co-existence probabilities 222 at each time interval t.

The values $p(s_i, s_j)$ of co-prediction accuracies 224 can be represented as decimal numbers ranging from −1.0 to 1.0. An absolute value of $p(s_i, s_j)$ can indicate a prediction accuracy for using sensor data from a j-th sensor data stream to predicting proxy sensor data for an i-th sensor data stream. As the absolute value of $p(s_i, s_j)$ increases towards 1.0, a prediction accuracy increases. As the absolute value of $p(s_i, s_j)$ decreases towards 0.0, a prediction accuracy decreases. In the example shown in FIG. 3, $p(s_1, S_2)$ is 0.7 and $p(s_1, s_4)$ is −0.9, which indicates that in the event that sensor data stream $SS_1$ is missing sensor data, it is more reliable to use sensor data from sensor data stream $SS_4$ to predict proxy sensor data for sensor data stream $SS_1$ because |−0.9| (absolute value −0.9) is greater than |0.7| (absolute value of 0.7). Here, the negative sign represents negative correlation between two sensor data, while the positive sign represents of positive correlation between two sensor data.

Processor 210 can be configured to determine the values $p(s_i, s_j)$ of co-prediction accuracies 224 based on historical sensor data from sensor data streams $SS_K$, where these historical sensor data can be stored in memory 220. In one embodiment, processor 210 can determine the values $p(s_i, s_j)$ based on historical sensor data within a predefined time period, and processor 210 can determine new values of $p(s_i, s_j)$ and update or populate co-prediction accuracies 224 at each predefined time period. By way of example, if the predefined time period is one hour, the values $p(s_i, s_j)$ can be determined based on historical sensor data collected within the past one hour. For every one hour, processor 210 can determine new values of $p(s_i, s_j)$, delete (from memory 220) the historical sensor data within the one hour that was used for determining the new values of $p(s_i, s_j)$, and populate co-prediction accuracies 224 with the new values of $p(s_i, s_j)$.

In one embodiment, processor 210 can determine values of $p(s_i, s_j)$ by determining the Pearson correlation between the historical sensor data, within the predefined time period, of two sensors or two sensor data streams. The Pearson correlation is a measure of linear correlation between historical data of the two sensors or sensor data streams (e.g., a ratio between covariance of two dataset and the product of their standard deviations). Hence, the Pearson correlation between two sets of historical sensor data can indicate a prediction accuracy of using one of the sensor data streams to predict proxy sensor data for the other sensor data stream.

Figure 4:
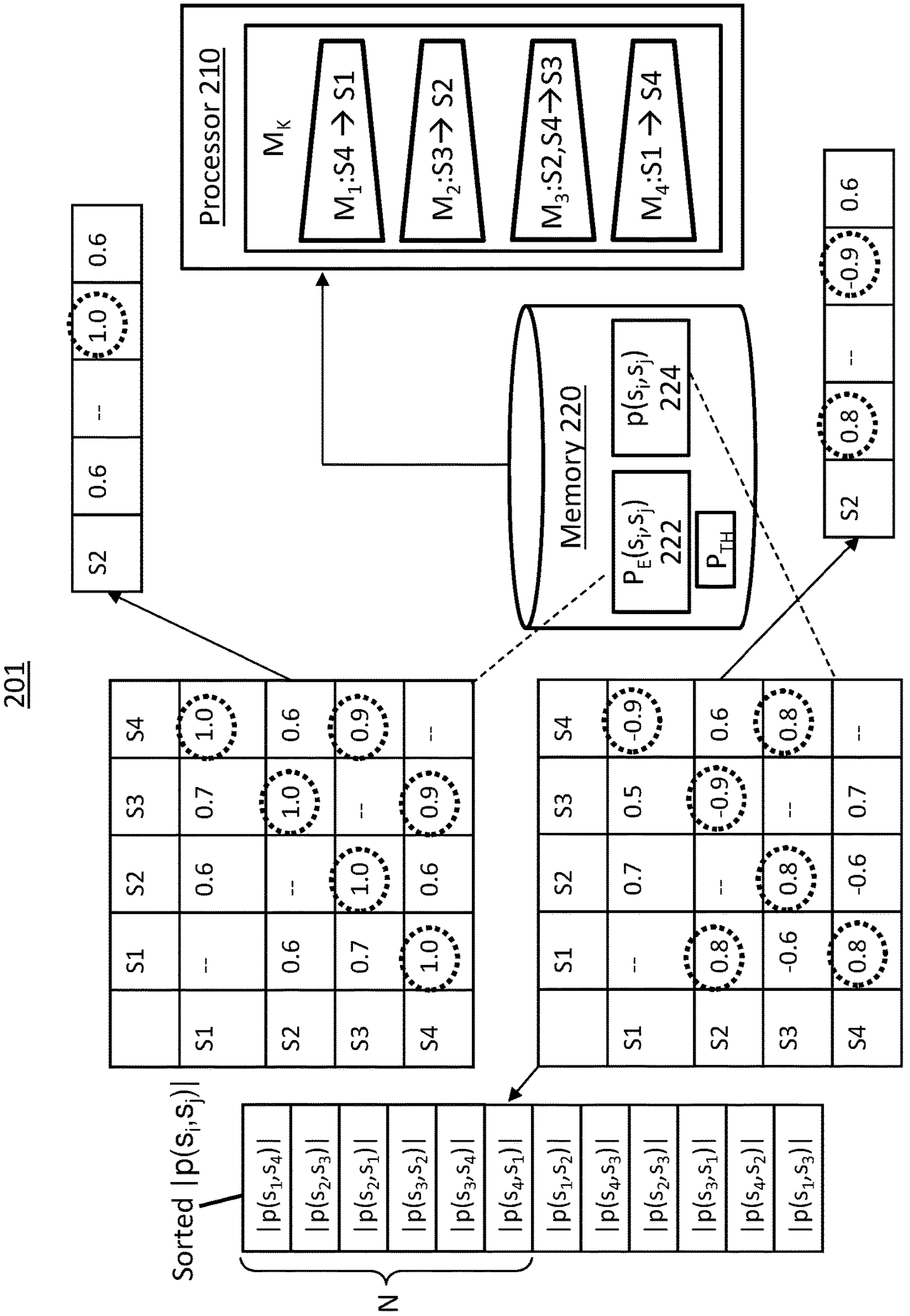
FIG. 4 illustrates an example of proxy sensor model training in lightweight sensor proxy discovery in power-aware devices in one embodiment.

FIG. 4 illustrates an example of proxy sensor model training in lightweight sensor proxy discovery in power-aware devices in one embodiment. Processor 210 can be configured to use co-existence probabilities 222 and co-prediction accuracies 224 to train proxy sensor models $M_K$. To train a proxy sensor model $M_i$ for a sensor $s_i$, processor 210 can sort absolute values of co-prediction accuracies 224 with sensors other than $s_i$, such as $S_K$ when K≠i, from the highest $|p(s_i, s_j)|$ to the lowest $|p(s_i, s_j)|$, or vice versa. An example of the sorted $|p(s_i, s_j)|$ is shown in FIG. 4.

A co-existence probability threshold $P_{TH}$ can be defined and stored in memory 220. To train a proxy sensor model $M_i$ for a sensor $s_i$, processor 210 can identify one or more co-existence probabilities 222 that are greater than or equal to $P_{TH}$. Based on the identification of the one or more $P_E(s_i, s_j)$ greater than or equal to $P_{TH}$, processor 210 can identify whether one or more corresponding co-prediction accuracies 224 is among the N highest $|p(s_i, s_j)|$ in the sorted values of $|p(s_i, s_j)|$ or not. In one embodiment, N can be a predefined parameter based on one or more performance factors, such as power consumption and resources of the device implementing system 201, user-applicability of particular sensors, or other performance factors. By way of example, in a resource constrained setting, N can be chosen to be a relatively small number such that less sensors are being selected and used for proxy data generation. If a particular sensor has limited user-applicability, N can also be defined at a lower value.

In the example shown in FIG. 4, if $P_{TH}$=0.8 and processor 210 is training proxy sensor model $M_2$ for sensor $S_2$, processor 210 can identify $P_E(s_2, S_3)$=1.0 that is greater than or equal to $P_{TH}$=0.8. Based on the identification of $P_E(s_2, s_3)$, processor 210 can identify whether a corresponding co-prediction accuracy $p(s_2, s_3)$ is among the N highest $|p(s_i, s_j)|$ in the sorted values of $P_E(S_1, S_4)$ or not. In the example shown in FIG. 4, if N=6, then $|p(s_2, S_3)|$ is among the highest $|p(s_i, s_j)|$. Based on $P_E(s_2, s_3)$ being greater than $P_{TH}$ and $|p(s_2, s_3)|$ being among the highest N $|p(s_i, s_j)|$, processor 210 can select sensor $S_3$ as a sensor that can provide a sensor data stream (e.g., $SS_3$) to predict proxy sensor data for sensor $S_2$. Processor 210 can generate proxy sensor model $M_2$ that uses sensor data from sensor $S_3$, or sensor data stream $SS_3$, to generate proxy sensor data for sensor $S_2$.

Note that despite an absolute value of co-prediction accuracy p $(s_2, S_1)$ is among the N highest $|p(s_i, s_j)|$, sensor $S_1$ is not chosen by processor 210 to train proxy sensor model $M_2$ because the co-existence probability $P_E(s_2, s_1)$=0.6, which is below the predefined $P_{TH}$=0.8. Further, in the example shown in FIG. 4, processor 210 selected sensor $S_1$ to train proxy sensor model $M_4$, but not sensor $S_3$ despite $P_E(S_4, S_3)$=0.9 being greater than the predefined $P_{TH}$=0.8 because the co-prediction accuracy p $(S_4, S_3)$ is not among the n highest $|p(s_i, s_j)|$.

After training the proxy sensor models $M_K$, processor 210 can run the proxy sensor models $M_K$ to generate proxy sensor data in response to detecting missing sensor data as shown in FIG. 1. Processor 210 can identify missing sensor data in a sensor $s_i$, and run proxy sensor model $M_i$ to use sensor data from one or more sensor data streams associated with sensor $S_i$ to predict a value of the missing sensor data. In one embodiment, if there is no sensor with co-existence probability being greater than or equal to $P_{TH}$, a proxy sensor model $M_K$ may not associate sensor $S_i$ to any sensor and processor 210 can perform a forward filling function using historical data of sensor $S_i$ to predict and generate proxy sensor data for sensor $S_i$.

Processor 210 can periodically perform incremental machine learning techniques, such as a Hoeffding decision tree, or light gradient-boosting machine (lightGBM), or the like, to re-train machine learning function f(•) in proxy sensor models $M_K$. By way of example, processor 210 can perform incremental learning by re-training f(•) in proxy sensor models $M_K$ using update values in co-existence probabilities 222 and co-prediction accuracies 224. In one embodiment, processor 210 can continuously update co-existence probabilities 222 and co-prediction accuracies 224 stored in memory 222 and re-train f(•) in proxy sensor models $M_K$ periodically. Note that processor 210 may not need to re-train f(•) in proxy sensor models $M_K$ at every update of co-existence probabilities 222 and co-prediction accuracies 224. By way of example, processor 210 can continuously update co-existence probabilities 222 at a small frequency, such as every five seconds (e.g., t=5 seconds), update co-prediction accuracies 224 every one hour, and re-train f(•) in proxy sensor models $M_K$ at a relatively large time interval, such as once per month.

This incremental machine learning training of proxy sensor models $M_K$ using co-existence probabilities 222 and co-prediction accuracies 224 can consume relatively less computational resource when compared to conventional techniques, such as techniques where models are trained using past time series sensor data. Also, the incremental training of proxy sensor models $M_K$ using co-existence probabilities 222 and co-prediction accuracies 224 can address possible sensor data distribution shift and avoid having proxy sensor models that bias towards a particular recently seen sensor data stream, or more sensor data stream that has available sensor data frequently. The systems and methods described herein can provide lightweight auto-discovery of proxy models (e.g., models built based on discovery or identification of sensor data stream that can be used as proxy for another sensor data stream) using co-existence probabilities and co-prediction accuracies. The usage of co-existence probabilities and co-prediction accuracies can be lightweight (e.g., less memory footprint and relatively fast) because the training and updates of the proxy models and updates to co-existence probabilities and co-prediction accuracies involve relatively less complexity when compared with conventional techniques.

In one embodiment, processor 210 can also update proxy sensor models $M_K$ periodically without re-training f(•) in proxy sensor models $M_K$. The update to proxy sensor models $M_K$ can be performed more frequently than the re-training f(•) in of proxy sensor models $M_K$. By way of example, processor 210 can update proxy sensor models $M_K$ every day and re-train f(•) in proxy sensor models $M_K$ every month. In one embodiment, to update a proxy sensor model $M_i$, processor 210 can use the recent data from the set of sensors used during full training to update the associations of sensors in proxy sensor model $M_K$. This update process may optionally identify sensors $s_j(j \neq i)$ that have co-existence probabilities 222 greater than or equal to the co-existence probability threshold $P_{TH}$. In one embodiment, this update process need not use co-prediction accuracies 224, and need not perform the sorting and selection steps. In that way, computational run time can be reduced. Updating the proxy sensor models $M_K$ more frequently than re-training f(•) in the proxy sensor models $M_K$ can maintain an accuracy of the proxy sensor models $M_K$ without using excessive power and computation by processor 210.

The update to model $M_i$ can modify the parameters or weights of a parametric model. By way of example, if model $M_i$ is a trained decision tree, the update of trained decision tree $M_i$ can include obtaining new or recent sensor data (e.g., within a past X amount of time, such as within the past one hour, or other relatively short time). A decision tree can be initialized based on the trained decision tree $M_i$. The obtained recent sensor data can be inputted, sequentially, into the initialized decision tree and the initialized decision tree can be traversed by following split points to reach a specific leaf node that corresponds to the inputted recent sensor data. Node statistics of the specific leaf node can be updated by updating a cut-off value for the specific leaf node, or by modifying any other parameters of the specific leaf node. Other updates can include updates to tree structure such as tree pruning or tree expansion if a certain condition in the specific leaf node is violated. An example of model $M_i$ can be a Hoeffding decision tree, where techniques such as internal statistical tests can be used for performing updates such as tree pruning and/or tree expansion. The input of new or recent sensor data, traverse to reach or identify a leaf node, update of the node statistics and/or the tree structure, can be repeated until all new or recent sensor data have been used. Such updates can adjust model $M_i$ according to new and changing data distribution.

Figure 5:
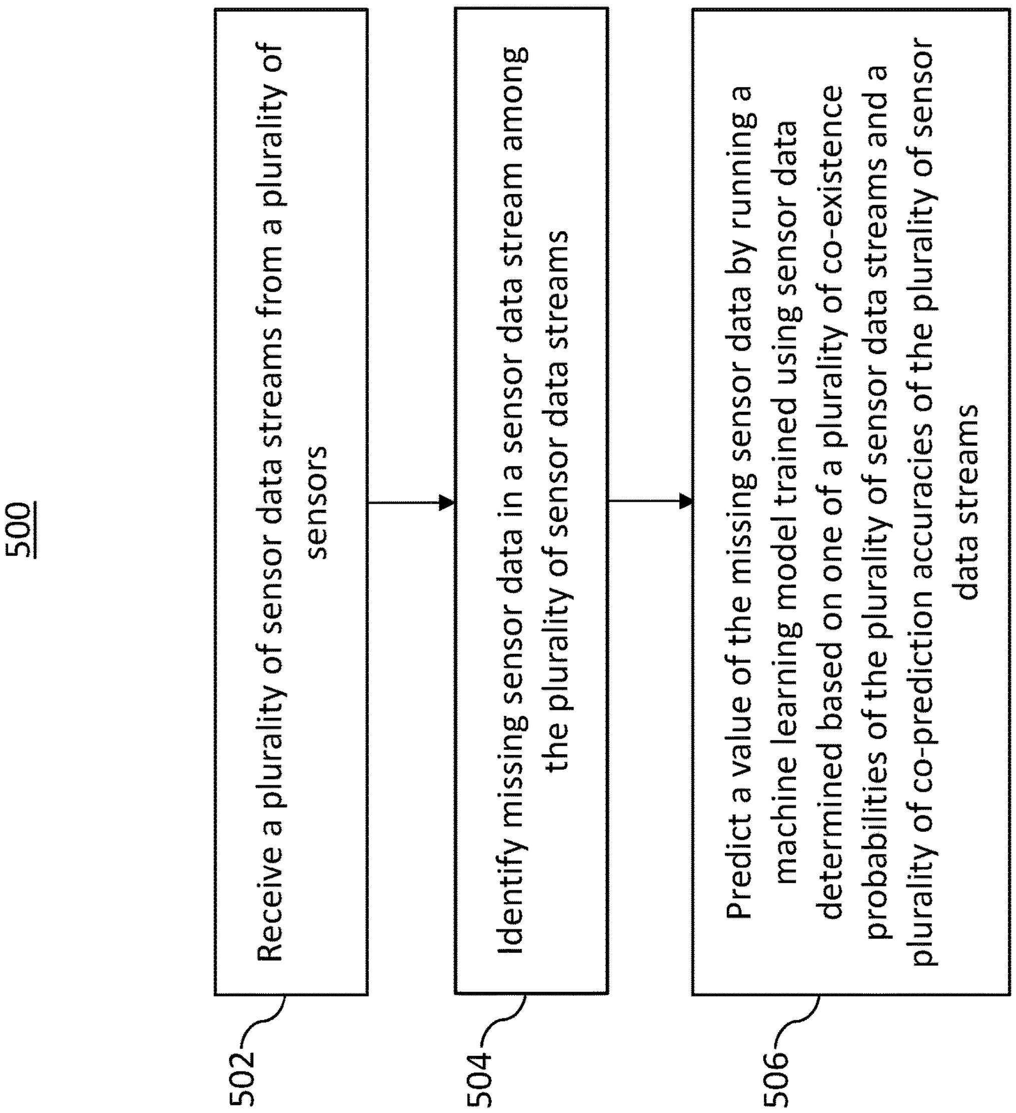
FIG. 5 illustrates a flow diagram relating to lightweight sensor proxy discovery in power-aware devices in one embodiment.

FIG. 5 illustrates a flow diagram relating to lightweight sensor proxy discovery in power-aware devices in one embodiment. The process 500 in FIG. 5 may be implemented using, for example, system 100 or 201 discussed above. An example process may include one or more operations, actions, or functions as illustrated by one or more of blocks 502, 504, and/or 506. Although illustrated as discrete blocks, various blocks may be divided into additional blocks, combined into fewer blocks, eliminated, performed in different order, or performed in parallel, depending on the desired implementation.

Process 500 can begin at block 502. At block 502, a processor can receive a plurality of sensor data streams from a plurality of sensors. Process 500 can proceed from block 502 to block 504. At block 504, the processor can identify missing sensor data in a sensor data stream among the plurality of sensor data streams. Process 500 can proceed from block 504 to block 506. At block 506, the processor can predict a value of the missing sensor data by running a machine learning model. The machine learning model can be trained using sensor data determined based on one of a plurality of co-existence probabilities of the plurality of sensor data streams and a plurality of co-prediction accuracies of the plurality of sensor data streams.

In one embodiment, the processor can be configured to update the plurality of co-existence probabilities by tracking co-existence events of every pair of sensors among the plurality of sensors. A co-existence event of a pair of sensors indicates that both sensors in the pair of sensors have sensor data available at a time instance.

In one embodiment, the processor can be configured to update the plurality of co-prediction accuracies by storing historical sensor data from the plurality of sensor data streams within a predefined time interval, determining correlations between every pair of the stored historical sensor data, and update the plurality of co-prediction accuracies based on the determined correlations. In one embodiment, the processor can determine the by determining Pearson correlations between every pair of the stored historical sensor data. In one embodiment, the processor can, in response to a lapse of the time interval, delete the plurality of co-prediction accuracies determine a new set of co-prediction accuracies.

In one embodiment, the processor can train a plurality of proxy sensor models for the plurality of sensors. The processor can train a proxy sensor model of a sensor by sorting the plurality of co-prediction accuracies from a highest value to a lowest value. The processor can define a number of highest co-prediction accuracies in the sorted co-prediction accuracies. The processor can identify a set of sensors that has a co-existence probability with respect to the sensor above a predefined co-existence probability threshold. The processor can determine co-prediction accuracies of the set of sensors are among the number of highest co-prediction accuracies. The processor can, in response to determining the co-prediction accuracies of the set of sensors are among the number of highest co-prediction accuracies, train the proxy sensor model using sensor data from the set of sensors.

In one embodiment, the processor can update the plurality of proxy sensor models periodically at a first time interval and re-train the plurality of proxy sensor models periodically at a second time interval greater than the first time interval. In one embodiment, the processor can update the plurality of proxy sensor models periodically using the plurality of co-existence probabilities. The processor can also re-train the plurality of proxy sensor models periodically using the plurality of co-existence probabilities and the plurality of co-prediction accuracies.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

receiving a plurality of sensor data streams from a plurality of sensors;

identifying missing sensor data in a sensor data stream from a first sensor among the plurality of sensors;

running a machine learning model to predict a value of the missing sensor data in the sensor data stream from the first sensor, wherein the machine learning model is trained using sensor data determined based on at least one of a plurality of co-existence probabilities corresponding to the first sensor and a second sensor among and a plurality of co-prediction accuracies corresponding to the first sensor and the second sensor;

generating a set of sensor data without missing sensor data, wherein the set of sensor data includes the sensor data stream and the predicted values of the missing sensor data;

updating, periodically, the plurality of co-existence probabilities corresponding to the first sensor and the second sensor and updating the plurality of co-prediction accuracies corresponding to the first sensor and the second sensor; and re-training, periodically, the machine learning model using the updated co-existence probabilities and updated co-prediction accuracies corresponding to the first sensor and the second sensor.

2. The computer-implemented method of claim 1, wherein updating the plurality of co-existence probabilities comprises tracking co-existence events of every pair of sensors among the plurality of sensors, and a co-existence event of a pair of sensors indicates that both sensors in the pair of sensors have sensor data available at a time instance.

3. The computer-implemented method of claim 1, wherein updating the plurality of co-prediction accuracies comprises:

storing historical sensor data from the plurality of sensor data streams within a predefined time interval;

determining correlations between every pair of the stored historical sensor data; and updating the plurality of co-prediction accuracies based on the determined correlations.

4. The computer-implemented method of claim 3, wherein determining correlations comprises determining Pearson correlations between every pair of the stored historical sensor data.

5. The computer-implemented method of claim 3, further comprising in response to a lapse of the time interval:

deleting the plurality of co-prediction accuracies; and determining a new set of co-prediction accuracies.

6. The computer-implemented method of claim 1, wherein the machine learning model is a proxy sensor model among a plurality of proxy sensor models corresponding to the plurality of sensors, and the method further comprising training the plurality of proxy sensor models, and training the proxy sensor model comprises:

sorting the plurality of co-prediction accuracies from a highest value to a lowest value;

defining a number of highest co-prediction accuracies in the sorted co-prediction accuracies;

identifying a set of sensors that has a co-existence probability with respect to the sensor above a predefined co-existence probability threshold;

determining co-prediction accuracies of the set of sensors are among the number of highest co-prediction accuracies; and in response to determining the co-prediction accuracies of the set of sensors are among the number of highest co-prediction accuracies, training the proxy sensor model using sensor data from the set of sensors.

7. The computer-implemented method of claim 6, further comprising:

updating the plurality of proxy sensor models periodically at a first time interval; and re-training the plurality of proxy sensor models periodically at a second time interval greater than the first time interval.

8. The computer-implemented method of claim 1, wherein the first sensor and the second sensor are different types of sensors.

9. A system comprising:

a plurality of sensors including at least a first sensor and a second sensor;

a memory configured to store:

a plurality of co-existence probabilities of the plurality of sensors; and a plurality of co-prediction accuracies of the plurality of sensors;

a processor configured to:

receive a plurality of sensor data streams from the plurality of sensors;

identify missing sensor data in a sensor data stream from the first sensor;

run a machine learning model to predict a value of the missing sensor data in the sensor data stream from the first sensor, wherein the machine learning model is trained using sensor data determined based on at least one of the plurality of co-existence probabilities corresponding to the first sensor and the second sensor and the plurality of co-prediction accuracies corresponding to the first sensor and the second sensor;

generate a set of sensor data without missing sensor data, wherein the set of sensor data includes the sensor data stream and the predicted values of the missing sensor data;

update, periodically, the plurality of co-existence probabilities corresponding to the first sensor and the second sensor and updating the plurality of co-prediction accuracies corresponding to the first sensor and the second sensor; and re-train, periodically, the machine learning model using the updated co-existence probabilities and updated co-prediction accuracies corresponding to the first sensor and the second sensor.

10. The system of claim 9, wherein the processor is configured to update the plurality of co-existence probabilities by tracking co-existence events of every pair of sensors among the plurality of sensors, wherein a co-existence event of a pair of sensors indicates that both sensors in the pair of sensors have sensor data available at a time instance.

11. The system of claim 9, wherein the processor is configured to:

store, in the memory, historical sensor data from the plurality of sensor data streams within a predefined time interval;

determine correlations between every pair of the stored historical sensor data; and update the plurality of co-prediction accuracies based on the determined correlations.

12. The system of claim 11, wherein the processor is configured to, in response to a lapse of the time interval:

delete the plurality of co-prediction accuracies; and determine a new set of co-prediction accuracies.

13. The system of claim 9, wherein the machine learning model is a proxy sensor model among a plurality of proxy sensor models corresponding to the plurality of sensors, the processor is configured to:

train the plurality of proxy sensor models for the plurality of sensors, wherein to train the proxy sensor model of a sensor, the processor is configured to:

sort the plurality of co-prediction accuracies from a highest value to a lowest value;

define a number of highest co-prediction accuracies in the sorted co-prediction accuracies;

identify a set of sensors that has a co-existence probability with respect to the sensor above a predefined co-existence probability threshold;

determine co-prediction accuracies of the set of sensors are among the number of highest co-prediction accuracies; and in response to determination of the co-prediction accuracies of the set of sensors are among the number of highest co-prediction accuracies, train the proxy sensor model using sensor data from the set of sensors.

14. The system of claim 13, wherein the processor is configured to:

update the plurality of proxy sensor models periodically at a first time interval; and re-train the plurality of proxy sensor models periodically at a second time interval greater than the first time interval.

15. A computer program product comprising a non-transitory computer readable storage medium having program instructions embodied therewith, the program instructions readable by a device to cause the device to:

receive a plurality of sensor data streams from a plurality of sensors;

identify missing sensor data in a sensor data stream from a first sensor among the plurality of sensors;

run a machine learning model to predict a value of the missing sensor data in the sensor data stream from the first sensor, wherein the machine learning model is trained using sensor data determined based on at least one of a plurality of co-existence probabilities corresponding to the first sensor and a second sensor among a plurality of co-prediction accuracies corresponding to the first sensor and the second sensor;

generate a set of sensor data without missing sensor data, wherein the set of sensor data includes the sensor data stream and the predicted values of the missing sensor data;

update, periodically, the plurality of co-existence probabilities corresponding to the first sensor and the second sensor and updating the plurality of co-prediction accuracies corresponding to the first sensor and the second sensor; and re-train, periodically, the machine learning model using the updated co-existence probabilities and updated co-prediction accuracies corresponding to the first sensor and the second sensor.

16. The computer program product of claim 15, wherein the program instructions are readable by the device to cause the device to update the plurality of co-existence probabilities by tracking co-existence events of every pair of sensors among the plurality of sensors, wherein a co-existence event of a pair of sensors indicates that both sensors in the pair of sensors have sensor data available at a time instance.

17. The computer program product of claim 15, wherein the program instructions are readable by the device to cause the device to:

store historical sensor data from the plurality of sensor data streams within a predefined time interval;

determine correlations between every pair of the stored historical sensor data;

determine the plurality of co-prediction accuracies based on the determined correlations;

in response to a lapse of the predefined time interval:

delete the plurality of co-prediction accuracies;

determine a new set of co-prediction accuracies; and update the plurality of co-prediction accuracies using the new set of co-prediction accuracies.

18. The computer program product of claim 15, wherein the machine learning model is a proxy sensor model among a plurality of proxy sensor models corresponding to the plurality of sensors, and the program instructions are readable by the device to cause the device to train the plurality of proxy sensor models for the plurality of sensors, wherein to train proxy sensor model, the program instructions are readable by the device to cause the device to:

sort the plurality of co-prediction accuracies from a highest value to a lowest value;

define a number of highest co-prediction accuracies in the sorted co-prediction accuracies;

identify a set of sensors that has a co-existence probability with respect to the sensor above a predefined co-existence probability threshold;

determine co-prediction accuracies of the set of sensors are among the number of highest co-prediction accuracies; and in response to determination of the co-prediction accuracies of the set of sensors are among the number of highest co-prediction accuracies, train the proxy sensor model using sensor data from the set of sensors.

19. The computer program product of claim 18, wherein the program instructions are readable by the device to cause the device to:

update the plurality of proxy sensor models periodically at a first time interval; and re-train the plurality of proxy sensor models periodically at a second time interval greater than the first time interval.

* * * * *